Figure 1:
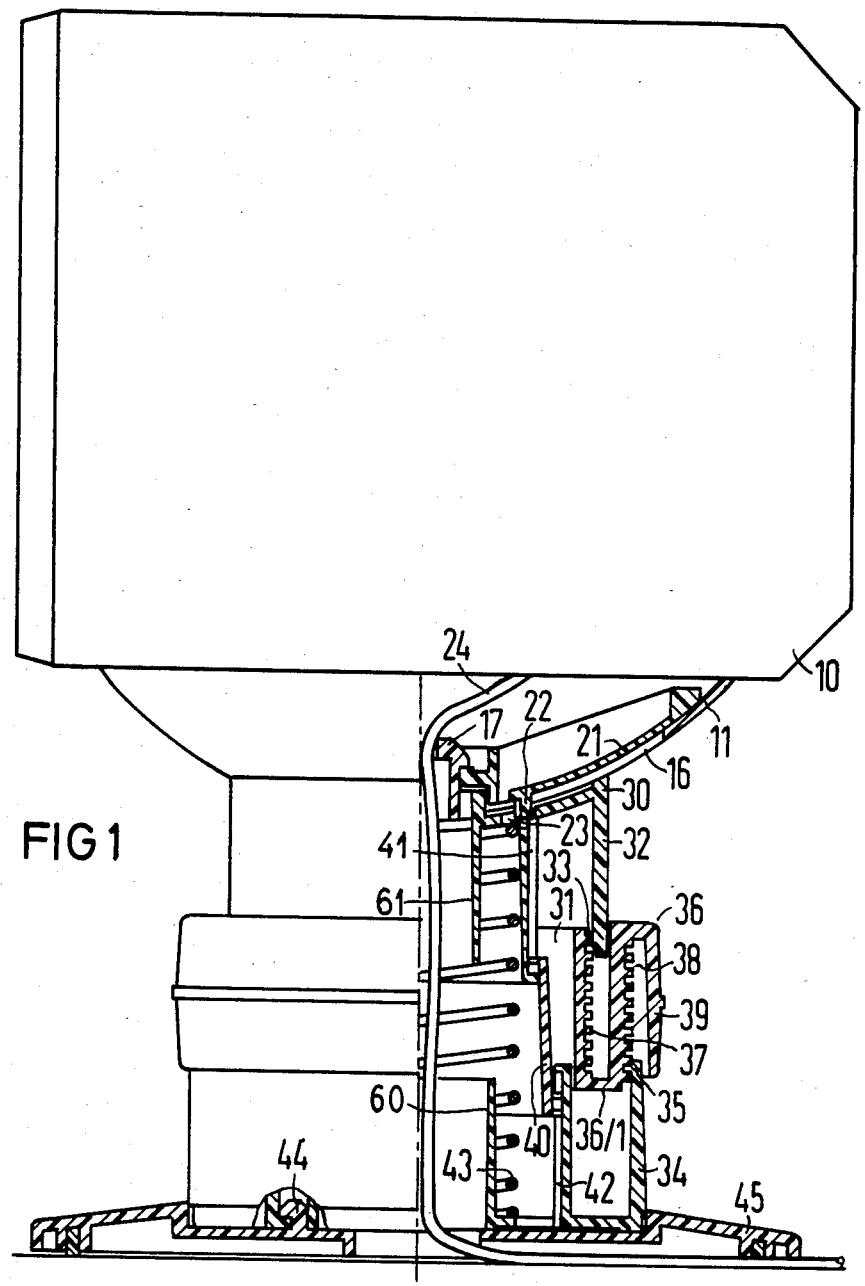

United States Patent [19]

Goetz

[11] Patent Number: 4,605,188

[45] Date of Patent: Aug. 12, 1986

[54] APPARATUS FOR SEATING A TERMINAL OR SIMILAR OFFICE EQUIPMENT

[75] Inventor: Werner Goetz, Munich, Fed. Rep. of Germany

[73] Assignee: Siemens Aktiengesellschaft, Berlin and Munich, Fed. Rep. of Germany

[21] Appl. No.: 642,678

[22] PCT Filed: Feb. 3, 1984

[86] PCT No.: PCT/DE84/00029

§ 371 Date: Aug. 15, 1984

§ 102(e) Date: Aug. 15, 1984

[87] PCT Pub. No.: WO84/03134

PCT Pub. Date: Aug. 16, 1984

[30] Foreign Application Priority Data

Feb. 8, 1983 [DE] Fed. Rep. of Germany ....... 3304217

[51] Int. Cl.$^4$ ............................................. F16M 11/00
[52] U.S. Cl. ..................................... 248/157; 248/178; 248/183; 248/278; 248/280.1
[58] Field of Search ................ 248/178, 183, 157, 278, 248/279, 280.1, 297.1, 660, 661, 662, 669, 349, 346, 371; 403/118, 43, 44, 45, 46, 48

[56] References Cited

U.S. PATENT DOCUMENTS

| | | |
|---|---|---|
| 1,565,878 | 12/1925 | White . |
| 2,420,364 | 5/1947 | Espenas ........................... 403/48 |
| 4,304,385 | 12/1981 | Farouche et al. ............. 248/183 X |
| 4,395,010 | 7/1983 | Hedgeland et al. ............ 248/371 X |
| 4,483,503 | 11/1984 | Gaham ............................ 248/349 |
| 4,533,105 | 8/1985 | Cornwell, Jr. et al. ........ 248/183 X |

FOREIGN PATENT DOCUMENTS

| | | |
|---|---|---|
| 0041804 | 6/1980 | European Pat. Off. . |
| 42030 | 12/1981 | European Pat. Off. ............ 248/183 |
| 0070337 | 1/1983 | European Pat. Off. . |
| 2847135 | 5/1980 | Fed. Rep. of Germany . |
| 360186 | 3/1962 | Sweden . |
| 837404 | 6/1960 | United Kingdom . |

Primary Examiner—J. Franklin Foss
Assistant Examiner—David L. Talbott
Attorney, Agent, or Firm—Hill, Van Santen, Steadman & Simpson

[57] ABSTRACT

Apparatus for mounting a computer terminal or word processor so that it can be vertically adjusted and/or angularly adjusted comprising an upper cap piece into which the terminal is received and which has a threaded stud mounted therein and a lower base member with a second threaded stud mounted therein and with a central adjustment member mounted between the upper cap piece and the lower base piece and threadedly connected to the upper cap piece and the lower base piece such that when the adjustment member is rotated a first threaded portion engages the threaded stud of the upper cap member and a second thread on the adjustment member engages the second threaded stud of the lower base member and wherein the threads on the adjustment member are of opposite direction to each other such that when the adjustment member is manually rotated a telescope vertical displacement of the cap member relative to the base member occurs due to turning of the central adjustment member with an external gripping surface. An antitwist means is provided between the cap member and the base member to prevent twisting and the terminal is pivoted and twisted by means of a carrier plate which is shaped like a spherical cap which forms the lower portion of the computer terminal housing and which rests on a collar portion of the cap member and can be releasably moved with the terminal with a guiding member.

15 Claims, 6 Drawing Figures

U.S. Patent Aug. 12, 1986 Sheet 3 of 3 4,605,188
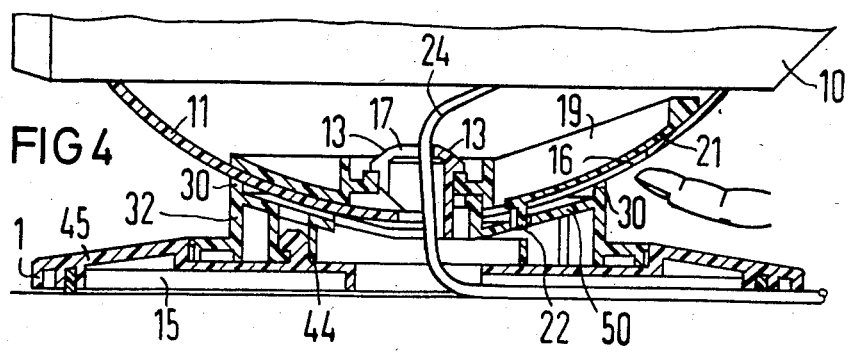
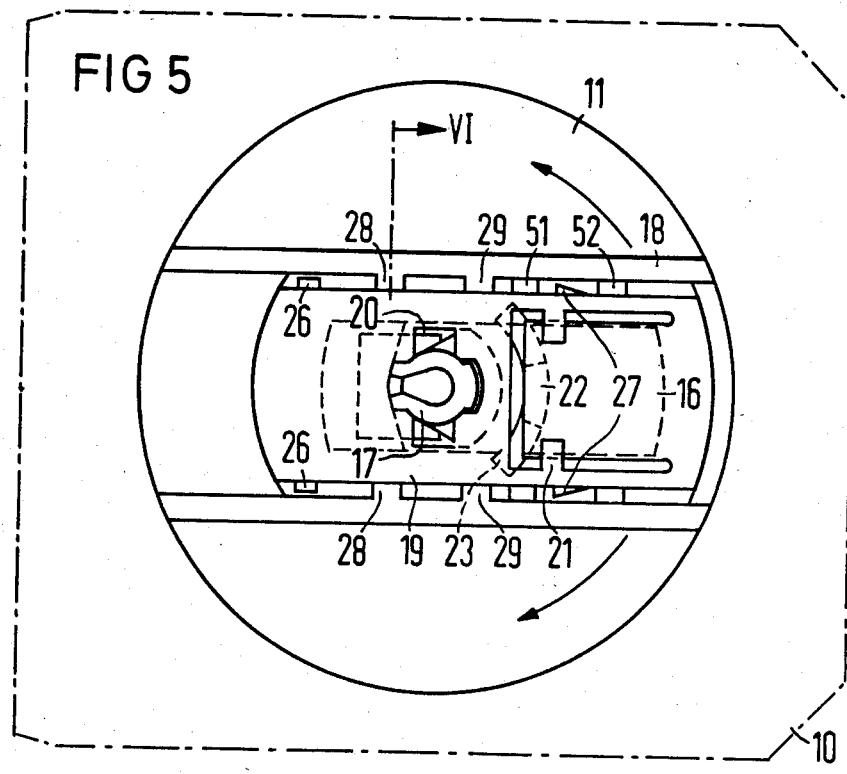
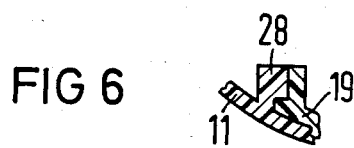

ical swing slot for the acceptance of a retaining element allocated to the supporting element. A screwed connection thereby serves as retaining element.

APPARATUS FOR SEATING A TERMINAL OR SIMILAR OFFICE EQUIPMENT

BACKGROUND OF THE INVENTION

1. Field of the Invention

This invention relates in general to apparatus for mounting a computer terminal or word processor or similar office equipment on a base such that it can be vertically and angularly adjusted relative to the base.

One is at pains given work at a terminal such as represented, for example, by a video terminal or the like, to erect the terminal in a position in which the fewest possible disturbing influences are exerted on the operator with respect, for example, to viewing direction, distance and reflection of extraneous light.

2. Description of the Prior Art

It is known from the DE-OS No. 28 47 135 to erect a video terminal on a supporting apparatus. This consists of a base part with a turntable ring seated thereon, a supporting arm at a horizontally proceeding shaft being applied to said ring for height adjustment. A pivotable supporting arm for carrying the video terminal is supported at the free end thereof, said pivotable supporting arm always guaranteeing a parallel attitude of the video terminal relative to itself given a height adjustment on the basis of a parallel guide disposed in the supporting arm. The supporting apparatus also comprises a weight equalization means by means of which the torque exerted on the supporting arm with respect to its first axis by the weight of the video terminal and of the supporting arm is at least approximately compensated in every position of the supporting arm. The weight equalization means is formed by a torsion spring which is disposed in the articulated joint between the supporting arm and the turntable ring and which coaxially surrounds the first axis.

The design of the weight equalization means as a torsion spring which is disposed in the articulated joint has the disadvantage, however, that installation connected with a pre-stress of the torsion spring is difficult to manipulate with an increasing spring power of the torsion spring. Torsion springs having low spring power, however, exclude the utilization of the supporting apparatus for large video terminals. The height adjustment with the supporting arm has the disadvantage that the location of the center of gravity changes given a higher adjustment, so that a relatively large or, respectively, heavy base part must be employed. Since the torsion spring does not have a linear force function, the height adjustment dependent on the height must ensue with differing force. The overall structure is thereby relatively complicated and intractable.

Further known from the E-PS No. 00 41 804 is an apparatus for the releasable seating of a terminal which contains a carrier plate shaped calotte-like which accepts the terminal and which is rotatably and pivotably disposed on a supporting element and comprises a horizontal swing slot for the acceptance of a retaining element allocated to the supporting element. A screwed connection thereby serves as retaining element.

SUMMARY OF THE INVENTION

The object of the invention is to design an apparatus of the type initially cited such that it can be constructed of plastic parts in a simple fashion without screwed connections and such that easy adjustment is nonetheless possible.

It is an object of the present invention to provide an apparatus for mounting a computer terminal or word processor so that it can be angularly and vertically adjusted and which is constructed from plastic parts and comprises a simple assembly without nut and bolt connections and wherein the adjustments can be easily made.

The novel adjustable amount for computer terminals and word processing equipment comprises three members including a base member, an upper equipment receiving member and an intermediate adjustment member mounted between the base member and the upper receiving member which allows the vertical adjustment of the computer terminal or word processor in a simple manner.

The three main parts of the mounting apparatus may be made of plastic which are mutually interconnected by a catch means in a simple and inexpensive design. All individual elements connect to each other with positive locking and without loss motion between the various parts.

Deriving in that all elements of the apparatus consist of plastic parts which are mutually interconnected via catch elements is a simple and cost-favorable design of the overall apparatus. All individual elements are connected to one another with positive lock, a play-free adjustability of the overall apparatus deriving therefrom.

Three of the cylindrical plastic die-cast parts forming the carrier element, namely the cap piece, the base piece and the adjustment piece, are provided with a thread or, respectively, thread set-ups, namely in such manner that there is an interplay between a lefthand and righthand thread pairing. An anti-twist element connecting the cap piece to the base piece secured against twisting prevents an unintended displacement and turning of the elements relative to one another. The column-like carrier element is adjusted in height by means of twisting the central, cylindircal adjustment piece which is provided with a gripping ring.

Via a support plate shaped calotte-like or hollow hemispherical shaped and forming the bottom of the terminal housing and comprising a horizontal swing slot into which a retaining element engages, the terminal itself rests on a collar part of the cap piece, so that the terminal can be turned and tilted.

A particularly exact and reliable guidance of the terminal on the actual column-like carrier element constructed of discrete elements is achieved by means of employing a carrier element covering the horizontal swing slot, said carrier element comprising an externally actuatable, resilient catch element which simultaneously serves as a twist stop.

Due to the easy releasability of the calotte-like carrier plate designed as an integrated component of the terminal housing from the carrier element via the gliding element or, respectively, the externally actuatable tongue, the terminal can be quickly equipped with different carrier elements, for example with carrier elements having adjustable height or with very short carrier elements which comprise catch elements in their lower range with which the carrier element and, thus, the entire terminal can be put in place on the actual office equipment allocated to the terminal or, on the other hand, can be latched to a special base plate. The terminal together with the carrier plate (housing floor)

can thereby be lifted off from the pedestal-like carrier element via actuation of the tongue of the gliding element, said tongue being accessible from the outside via the horizontal swing slot.

Figure 2:
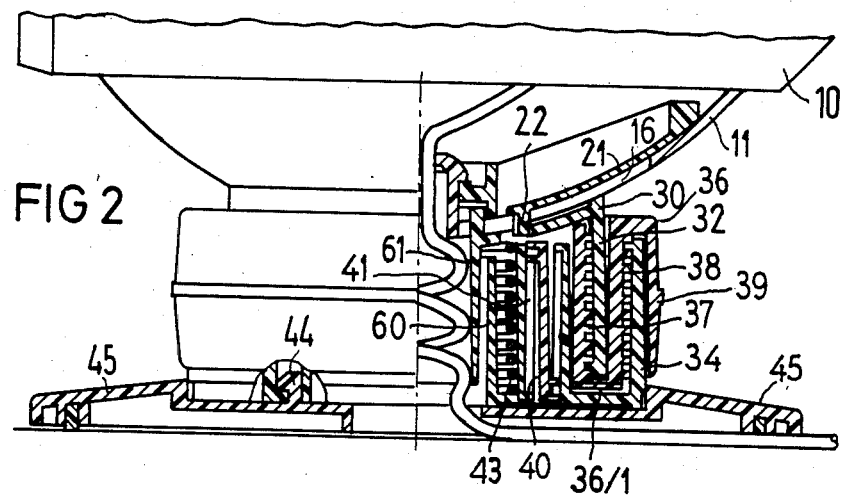
Figure 3:
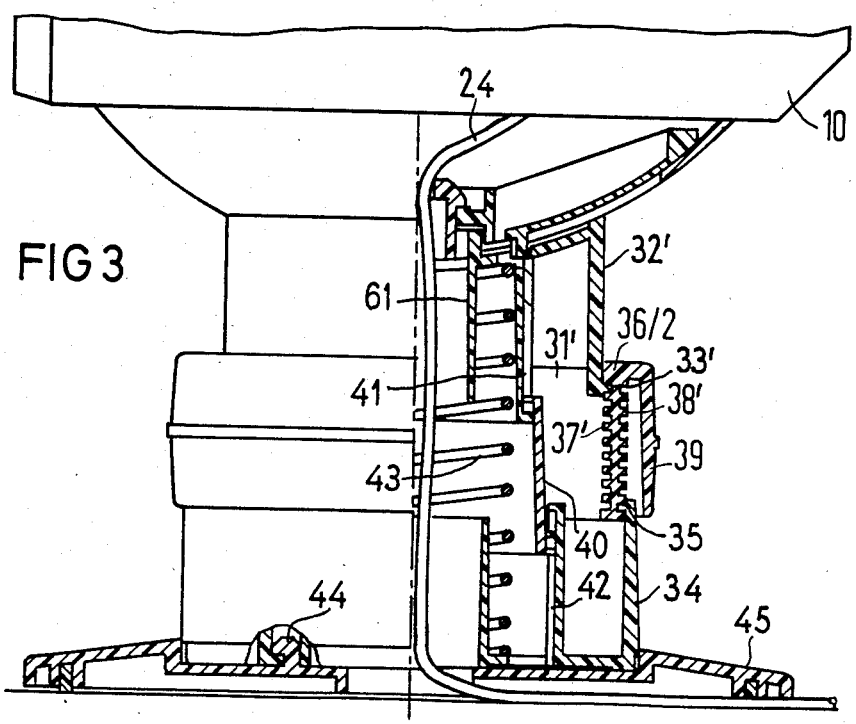

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

FIG. 1 the seating apparatus, partially in a section view in the extended condition;

FIG. 2 the seating apparatus in its retracted condition, shown partially in section;

FIG. 3 the seating apparatus in its extended condition upon employment of an adjustment pieces with thread disposed on both sides;

FIG. 4 a section view of the seating apparatus with appertaining gliding element;

FIG. 5 an elevation of the seating apparatus from above with removed terminal bottom; and FIG. 6 a section view of the guidance of the gliding element in the carrier plate.

FIG. 1 shows the arrangement of a video terminal 10 on the seating apparatus. The seating apparatus thereby contains a carrier element that essentially consists of three parts, namely an upper cap piece 32 which accepts the terminal 10 and comprises an internally disposed, first thread stud 33 which is designed righthand. Further, a lower, cylindrical base piece 34 with a second threaded stud 35 which is designed lefthand and is likewise inwardly disposed. A central, cylindrical adjustment piece 36 is situated between the upper cap piece 32 and the lower base piece 34. The adjustment piece 36 contains a threaded piece 36/1 consisting of a dynamically balanced member comprising a central passage 31. It comprises a first thread 37 interacting with the first threaded stud 33 and a second thread 38 interacting with the second thread stud 38, whereby the threads proceed opposed relative to one another. The wall regions of the threaded piece 36/1 which carry the threads 37 and 38 and proceed concentrically relative to the rotational axis have a U-shaped cross-sectional structure, whereby one respective thread is disposed on one lateral flank of the U-shaped, cross-sectional structure. A gripping piece with externally disposed fluting for the adjustment of the threaded piece 36 is connected to the thread and designed of one piece therewith. The gripping piece 39 thereby proceeds concentrically relative to the threads 37 and 38 and is manufactured as a common element with the threaded piece 36 in the injection moulding process.

A telescope-like displacement of the cap piece 32 relative to the base piece 34 is effected via the threaded piece 36/1 by means of turning the outwardly disposed gripping piece 39. It is thus possible to displace the cap piece 32 and the base piece 34 inside one another telescope-like and thus change height of the video terminal or, respectively, of the terminal by means of simply twisting the gripping piece 39 and, thus, the threaded piece 36.

In order to prevent the cap piece 32 and the base piece 34 from twisting relative to one another when the gripping piece 39 is turned, a cylindrical anti-twist element 40 is situated in the inside of this height-adjustable seating apparatus, said element 40 being guided in guidance 41 and 42 of the cap piece 32 and of the base piece 34. The guidances 41 and 42 are respectively integrally connected to the cap piece 32 and, respectively, the base piece 34, whereby the guidances 41 and 42 are designed as channels of a cylindrical part of these elements.

The threads of the individual elements 32 and 34 are designed such with respect to their leads that they cannot dislocate relative to one another automatically as a consequence of the weight of the video terminal. Nonetheless, given a corresponding design of the lead, a single revolution of the gripping piece 39 can be sufficient to traverse the entire range of adjustment of the seating apparatus.

The arrangement also contains a spring element 43 designed as a flat coil spring between the cap piece 32 and the base piece 34.

A disk-shaped base plate 45 is connected to the base piece 34 via latch connections 44. The spring element facilitates the turning of the gripping piece 39, since this spring element 43 absorbs part of the weight of the video terminal.

In addition to the separate disposition of the threads 37 and 38 of the threaded piece 36, an embodiment as shown in FIG. 3 is also possible wherein the threaded piece consists of a dynamically balanced member 36/2 having a central passage 31, those regions thereof which bear the threads 37 and 38 proceeding concentrically relative to the rotational axis and forming elements of a hollow cylinder on whose inside and outside surfaces the threads are disposed.

FIG. 3 illustrates a modification of the invention which uses a modified intermediate manually adjustable member 36/2 and wherein the upper cup member 32 has an external thread 33' rather than internally extending thread as illustrated in FIGS. 1 and 2. The threaded member 36/2 has a central passage 31' and the threaded portions 37' and 38' which are formed on the inner and outer hollow cylindrical surface of the member 36/2 as shown and which threadedly mate with the threads 31' and 35 of the members 32' and 34. FIG. 3 illustrates the video terminal 10 in the full-up position and as the manual member 39 is rotated the terminal 10 will move to a lower or full-down position.

A particular development (FIG. 4) of the upper part of the cap piece 32 in the form of a cylindrical, circumferential collar part 30 enables the twistable and pivotable seating of a carrier plate 11 which is shaped calotte-like. The carrier plate 11 thereby forms the housing floor of the terminal 10 and is an integrated component of the terminal housing.

In order to enable the pivotability and twistability between the terminal floor 11 and the cap piece 32, the carrier plate 11 comprises an oblong horizontal swing slot 16 through a retaining element designed as a retaining nose 17 engages. A gliding element 19 covering the horizontal swing slot 16 and guided anti-twist in guidances 18 (ribs) of the carrier plate 11 is disposed between the projections of the retaining nose 17 and the carrier plate 11. The gliding element 19 thereby comprises a locking opening 20 which is designed for the acceptance of the retaining nose 17 and cooperates with this retaining nose 17 in the manner of a bayonet catch, so that, as shall be explained later, the carrier plate 11 and, thus, the terminal 10 can be removed from the retaining nose 17 by means of turning from the locking position shown in FIG. 5 into a position which is rotated by 90° thereto.

In order to secure the gliding element 19 in the guidance 18, the gliding element comprises catch stops 26 and catch noses 27 which interact with corresponding catch stops 28,29 designed as ribs of the guidance 18 that have been moulded on.

In order to facilitate the insertion of the gliding element 19 into the guidances 18, openings 51 and 52 designed in accord with the catch stops 28,29 are formed on the gliding element 19. During assembly, the gliding element 19 is plugged via the openings 51 and 52 into the guidance 18 and the catch noses are then engaged behind the stop 29 by means of lateral pivoting.

In order to secure the connection between the retaining nose 17 and the carrier plate 11, a resilient catch element is formed in the gliding element 19, a stop nose 22 of said resilient catch element 21 engaging through the horizontal swing slot 16 into a semicircular slot 23 disposed on diagonal member 50 of the carrier element 12. The lateral limitations of the slot 23 thereby serve as a stop limit when turning the carrier plate 11 in order to thus prevent the feed line 24 conducted through the center of the cap piece 32 and through a central opening of the retaining nose 24 from being shorn off.

In order to be able to lift the terminal 10 with its base plate (carrier plate 11) off from the cap piece 32, the catch element 21 designed as a resilient catch tongue is raised from the outside through the horizontal swing slot 16 and the stop nose 22 is thus lifted out of the slot 23. In accord with the illustrated arrow directions, the terminal 10 together with the gliding element 19 can be rotated around the retaining nose 17 until the lock opening 20 which interacts with the retaining nose 17 in the manner of a bayonet catch releases the retaining nose 17. The terminal to together with the calotte-like carrier plate 11 forming the floor of the terminal can then be lifted off from the collar 30 of the cylindrical cap piece 32 serving as a guide for the carrier plate 11 and the terminal can be placed on a different cap piece, for example on a cap piece lower in height designed in accord with FIG. 4.

In its upper part, the retaining nose 17 comprises diagonal guide members 13 which center the gliding element 19 with respect to its lock opening when the terminal is put in place on the cap piece 32, said gliding element being displaceable between stops 26,27,28,29.

Given the cap piece 32 shown in FIG. 4, height adjustability has been foregone for the overall apparatus, whereby this pedestal-like cap piece 32 which is designed of one piece and short with respect to its height is likewise connectible via catch connections to the disk-shaped base plate 45.

Instead of being allocated to the base plate 45, the catch connections 44 can also be directly allocated to an equipment so that the terminal is directly emplaceable on the equipment either via the one-piece carrier element 12 or via the height-adjustable seating apparatus according to FIGS. 1 through 3.

Instead of being mounted on the base plate 45, the catch connections 44 can be directly connected to the equipment so that the terminal is directly mountable on the equipment either by way of the one piece carrier element 12 or by way of the height adjustable seating apparatus illustrated in FIGS. 1 through 3.

Although the invention has been described with respect to preferred embodiments thereof, it is not to be so limited as changes and modifications may be made therein which are within the full intended scope of the invention as defined by the appended claims.

I claim:

1. Apparatus for mounting a computer terminal (10) or similar office equipment, comprising an upper cap member (32) to which the terminal is connected and having a first threaded stud (33) extending downwardly therefrom, a lower base member (34) which has a second threaded stud (35) extending upwardly therefrom, a central adjustment member (36) which has a threaded portion (36/1) which has first threads (37) which mate with the first threaded stud (33) and second threads (38) which mate with the second threaded stud (35), and the threads (37, 38) are formed in the opposite direction relative to each other, said central adjustment member having an externally disposed gripping portion (39) which is connected to the threaded member (36), so that a telescope-like displacement of the cap member (32) relative to the base member (34) occurs when the threaded member (36) is turned with the gripping portion (39), and an anti-twist element (40) slidably connects the cap member (32) to the base member (34) to prevent them from twisting relative to each other, and wherein a spring element (43) for partially supporting the weight of the terminal is mounted between said cap member (32) and said base member (34).

2. Apparatus for mounting a computer terminal according to claim 1, wherein the threaded portion (36/1) consists of a dynamically balanced member which has a central passage (31), and the wall regions upon which said first and second threads are formed concentrically relative to the rotational axis and having a U-shaped cross-section and said first and second threads (37, 38) formed on one side wall of said U-shaped cross-sectional wall regions.

3. Apparatus for mounting a computer terminal according to claim 1, wherein said threaded portion consists of a dynamically balanced cylindrical member (36/2) having a central passage (31) and has regions which carry said first and second threads which are concentric relative to the rotational axis and form elements of a hollow cylinder on whose inside and outside surfaces, said first and second threads (37, 38) are formed.

4. Apparatus for mounting a computer terminal according to one of claim 2 or 3, wherein said gripping portion (39) consists of a cylindrical member connected to the threaded portion (36/1, 36/2).

5. Apparatus for mounting a computer terminal according to claim 1 wherein said gripping portion (39) and said threaded portion (36) consist of a single element.

6. Apparatus for mounting a computer terminal according to claim 1 wherein said cap member (32) is designed as a column-like carrier element for use without said adjustment member (36) and said base member (34) and comprises catch elements (44) at its lower end for the releasable connection of the cap member (32) to corresponding catch connections of a base plate (45) or of other equipment associated with the terminal.

7. Apparatus for mounting a computer terminal according to claim 1 wherein a carrier plate (11) which is bowl-shaped and can be rotated and swiveled is releasably mounted on the cap member (32, 12) and said carrier plate (11) formed with a slot (16) for horizontal rotation for engagement with a retaining element (17) of the cap piece (32, 12).

8. Apparatus for mounting a computer terminal according to claim 7, wherein said carrier plate (11) is an integral component portion of the terminal housing.

9. Apparatus for mounting a computer terminal according to claim 7 wherein the retaining element (17) is designed as a retaining nose and has a central through opening for passage of the terminal lead (34).

10. Apparatus for mounting a computer terminal according to claim 9, characterized in that said retaining element (17) comprises diagonal guides (13) which center the gliding element (19) with respect to its lock opening (20) when the carrier plate (11) including the terminal (10) is mounted.

11. Apparatus for mounting a computer terminal according to claim 1, 3 or 10, wherein all of the elements of the apparatus are formed of plastic.

12. Apparatus for mounting a computer terminal (10) or similar office equipment, comprising an upper cap member (32) to which the terminal is connected and having a first threaded stud (33) extending downwardly therefrom, a lower base member (34) which has a second threaded stud (35) extending upwardly therefrom, a central adjustment member (36) which has a threaded portion (36/1) which has first threads (37) which mate with the first threaded stud (33) and second threads (38) which mate with the second threaded stud (35), and the threads (37, 38) are formed in the opposite direction relative to each other, said central adjustment member having an externally disposed gripping portion (39) which is connected to the threaded member (36), so that a telescope-like displacement of the cap member (32) relative to the base member (34) occurs when the threaded member (36) is turned with the gripping portion (39), and an anti-twist element (40) slidably connects the cap member (32) to the base member (34) to prevent them from twisting relative to each other, wherein a carrier plate (11) which is bowl-shaped and can be rotated and swiveled is releasably mounted on the cap member (32, 12) and said carrier plate (11) formed with a slot (16) for horizontal rotation for engagement with a retaining element (17) of the cap piece (32, 12), and wherein a gliding element (19) which releasably accepts said retaining element (17) which covers the horizontal swing slot (16) and is guided so as not to twist in guidances (18) of the carrier plate is disposed between the retaining element (17) which engages the horizontal swing slot (16) of the carrier plate (11), said gliding element (19) comprising a resilient catch element (21) accessible from the outside through the horizontal swing slot (16) and engaging through the horizontal swing slot (16) stops (23) of the cap member (32), whereby the retaining element (17) is designed as a bayonet catch so that for releasing the carrier plate (11) and the terminal (10) from the cap member (32, 12) after disengagement of the catch element (21, 22) from the stop region (23), the carrier plate (11) is pivotable from a latched position to a position which releases the retaining element (17) and the gliding element (19) by actuation through the horizontal swing slot (16).

13. Apparatus for mounting a computer terminal according to claim 12, wherein said catch element (21) is designed as part of a catch tongue connected to the gliding element (19).

14. Apparatus for mounting a computer terminal according to claim 12, wherein said stops (23) are designed as limits of a semicircular catch opening (23) into which the catch element (22) is receivable.

15. Apparatus for mounting a computer terminal (10) or similar office equipment, comprising an upper cap member (32) to which the terminal is connected and having a first threaded stud (33) extending downwardly therefrom, a lower base member (34) which has a second threaded stud (35) extending upwardly therefrom, a central adjustment member (36) which has a threaded portion (36/1) which has first threads (37) which mate with the first threaded stud (33) and second threads (38) which mate with the second threaded stud (35), and the threads (37, 38) are formed in the opposite direction relative to each other, said central adjustment member having an externally disposed gripping portion (39) which is connected to the threaded member (36), so that a telescope-like displacement of the cap member (32) relative to the base member (34) occurs when the threaded member (36) is turned with the gripping portion (39), and an anti-twist element (40) slidably connects the cap member (32) to the base member (34) to prevent them from twisting relative to each other, wherein a carrier plate (11) which is bowl-shaped and can be rotated and swiveled is releasably mounted on the cap member (32, 12) and said carrier plate (11) formed with a slot (16) for horizontal rotation for engagement with a retaining element (17) of the cap piece (32, 12), wherein said carrier plate (11) is an integral component portion of the terminal housing and wherein a gliding element (19) which releasably accepts said retaining element (17) which covers the horizontal swing slot (16) and is guided so as not to twist in guidances (18) of the carrier plate is disposed between the retaining element (17) which engages the horizontal swing slot (16) of the carrier plate (11), said gliding element (19) comprising a resilient catch element (21) accessible from the outside through the horizontal swing slot (16) and engaging through the horizontal swing slot (16) stops (23) of the cap member (32), whereby the retaining element (17) is designed as a bayonet catch so that for releasing the carrier plate (11) and the terminal (10) from the cap member (32, 12) after disengagement of the catch element (21, 22) from the stop region (23), the carrier plate (11) is pivotable from a latched position to a position which releases the retaining element (17) and the gliding element (19) by actuation through the horizontal swing slot (16).

* * * * *